United States Patent [19]
Callander

[11] 3,926,958
[45] Dec. 16, 1975

[54] PREPARATION OF PENICILLIN SALTS

[75] Inventor: Sidney Edward Callander, Worthing, England

[73] Assignee: Beecham Group Limited, England

[22] Filed: May 13, 1974

[21] Appl. No.: 469,679

[30] Foreign Application Priority Data
May 15, 1973 United Kingdom............... 22982/73

[52] U.S. Cl............................. 260/239.1; 260/239.1
[51] Int. Cl.$^2$........................................ C07D 499/44
[58] Field of Search................................. 260/239.1

[56] References Cited
UNITED STATES PATENTS

| | | | |
|---|---|---|---|
| 3,714,157 | 1/1973 | Richardson | 260/243 C |
| 3,784,562 | 1/1974 | Hopewell | 260/468 J |

FOREIGN PATENTS OR APPLICATIONS

| | | | |
|---|---|---|---|
| 1,241,844 | 1971 | United Kingdom | 260/239.1 |
| 1,060,034 | 1967 | United Kingdom | 260/239.1 |
| 1,128,235 | 1968 | United Kingdom | 260/239.1 |

OTHER PUBLICATIONS

Kittila, "Dimethylformamide Chemical Uses" (introduction).

*Primary Examiner*—Gerald A. Schwartz

[57] ABSTRACT

Amoxycillin salts of improved quality may be prepared by precipitation as amide solvates. Preferred amides include dimethyl formamide, and dimethyl acetamide.

5 Claims, No Drawings

PREPARATION OF PENICILLIN SALTS

This invention relates to a process for the preparation of crystalline salt forms of 6-[D-α-amino-p-hydroxyphenylacetamido] penicillanic acid (hereinafter referred to as amoxycillin) and also to the salt forms of amoxycillin which are thus produced.

Amoxycillin has been shown to exist as the crystalline trihydrate and as the hydrated amorphous form. The trihydrate is the most stable and economical to produce on a commercial scale. Two main methods of preparing water-soluble pharmaceutically acceptable salts of amoxycillin (e.g. the sodium or potassium salts) have been proposed. In the first amoxycillin trihydrate is suspended in a solvent such as methylene dichloride plus methanol, di- or tri-ethylamine is added to form the di- or tri-ethylamine salt of amoxycillin, the solution is dehydrated using a desiccant such as a "molecular sieve", then filtered, and the desired salt of amoxycillin is precipitated by the addition of a source of the desired cation (e.g. sodium 2-ethylhexanoate where the sodium salt is desired). In this process the dehydration step was included, partly to reduce hydrolysis of the amoxycillin by the amine and the water released from the trihydrate after formation of the amine salt, but mainly because the water adversely affects the precipitation.

In the second known process for the preparation of salts of amoxycillin, the water content of amoxycillin trihydrate is reduced by treating with a lower alkanol (preferably methanol) and then treating the resultant gelatinous amoxycillin/methanol complex in a suitable organic solvent with a source of the desired cation (e.g. sodium 2-ethylhexanoate or sodium methoxide). Using this process, some improvements in the quality and stability may be obtained but still leaves room for improvement.

This invention is based on the discovery that by incorporating an amide, (particularly dimethylformamide or dimethylacetamide) into the solution of amoxycillin from which the desired salt is to be precipitated, the quality of the resultant precipitated salt is much improved.

Thus the present invention provides a process for the preparation of a crystalline solvate of an alkali metal or alkaline earth metal salt of amoxycillin, which process comprises adding a source of alkali metal or alkaline earth metal cations to a solution of amoxycillin or a salt thereof, said solution containing a pharmaceutically acceptable amide.

The amide which is present in the solution of amoxycillin or salt of amoxycillin is believed to form a solvated complex with the amoxycillin and measurable quantities of the amide are found in the precipitated crystalline salt. Thus it will be clear that the amide should be one which is pharmaceutically acceptable. Suitable amides include those of formula $RCONR_1R_2$, wherein R is a hydrogen atom, or a methyl group, and $R_1$ and $R_2$ are each a hydrogen atom, or a methyl or ethyl group, and urea. Amides that are preferred for the process of the invention include di-methylformamide and dimethylacetamide.

The source of pharmaceutically acceptable alkali metal or alkaline earth metal cations may be any of the precipitating agents used previously in the preparation of, for example, sodium, potassium, magnesium, aluminium or calcium salts of ampicillin (α-aminobenzylpenicillin) or other semi-synthetic penicillins. In particular, where the desired salt of amoxycillin is the sodium salt, the preferred source of sodium ions is sodium 2-ethylhexanoate, and to a lesser extent sodium methoxide. Using these precipitating agents and dimethylformamide as the amide, the resultant sodium salt of amoxycillin usually contains from 12 – 20% of amide, although the proportions vary depending on the solvent system chosen. However, for any particular solvent system, the quantity of dimethylformamide detectable in the precipitated sodium salt does not appear to vary much from batch to batch. This fact, together with other evidence from infra red spectra and crystalline appearance lead us to believe that the amides form complexes (by solvation) with the amoxycillin. Different amides appear to give complexes of differing amide content, and some amides do not give very well defined complexes. However, whatever the mechanism of action, the incorporation of amide into the precipitation medium gives salts of amoxycillin of improved quality. When preparing the sodium salt of amoxycillin using dimethylformamide as the amide, we find that the resulting salt is obtained in high yield, with improved crystallinity, increased water solubility, reduced moisture pick-up and increased stability.

The following Examples illustrate this invention:

EXAMPLE 1

Amoxycillin trihydrate (22 g., 0.05 mole) was partially desiccated by stirring with methanol for 0.5 hour (see British Patent No. 1,286,199). The gelatinous product was filtered off and resuspended in 50 mls. dimethylformamide (DMF). The slurry was cooled to 5° – 10°C and sodium methoxide (10% solution in methanol w/v) was added with vigorous stirring to give a final pH = 9.5. The solution was filtered and diluted with isopropanol (100 ml). After one hour the precipitate was collected by filtration, slurried in toluene, filtered and finally washed with toluene before drying in a forced air oven at 45°C. The yield was 16.3 g. and the product gave a chemical assay of 75.3% (as free acid).

EXAMPLE 2

A stirred slurry of amoxycillin trihydrate (132 g. 0.3 mole) in a mixture of isopropanol (1200 ml) and dimethylformamide (175 ml) was cooled to 5° – 10°C and treated with a solution of diethylamine (48 ml) in isopropanol (50 ml) dropwise over 30 minutes.

Stirring was continued for a further twenty minutes and the solution was filtered. Sodium 2-ethylhexanoate in methyl isobutyl ketone (150 ml of 36. 5% w/w solution, ca.0.3 mole) was added dropwise with stirring over 30 minutes at 5° – 10°C. The resultant precipitate was collected on a filter after 1.5 hours, washed with isopropanol (2 × 200 ml) and dried in a forced air oven at 40°C to give 131 g. of the desired sodium salt of amoxycillin. This product was found to give a chemical assay of 74.9% (as free acid) and was found to contain 16.6% of dimethylformamide by G.L.C.

EXAMPLE 3

Amoxycillin trihydrate (22.5 g.) was suspended in a mixture of ethanol (200 ml) and dimethylformamide (25 ml) with rapid stirring to break up the gelatinous amoxycillin/ethanol complex (see British Patent No. 1,286,199), and then cooled in an ice/water bath. Diethylamine (8.0 ml) was diluted with ethanol (8.0 ml)

and added to the suspension over 20 minutes. After a further 20 minutes stirring the solution was filtered and a solution of sodium 2-ethylhexanoate in anhydrous methyl iso-butyl ketone (26 ml of 2N solution) added in one portion. On cooling and scratching the resulting cloudy solution, a precipitate (square platelets and clusters) was formed after 10 minutes. The precipitate was washed with ethanol (20 ml) and air dried at 40°C to constant weight to give 18.3 g. (75%) of the desired sodium salt of amoxycillin. With a chemical assay of 74.9% (free acid) and contained 16.4% dimethylformamide (by n.m.r. spectroscopy).

EXAMPLE 4

The procedure of Example 3 was repeated using dimethylacetamide (25 ml) in place of dimethylformamide. A yield of 14.6 g. (58%) of the corresponding crystalline complex was obtained, chemical assay: 74.3% (as free acid) and containing 13.1% dimethylacetamide (by n.m.r. spectroscopy).

I claim:

1. A process for the preparation of a crystalline solvate of an alkali metal or alkaline earth metal salt of amoxycillin, which process comprises adding a source of alkali metal or alkaline earth metal cations selected from sodium, potassium, calcium or magnesium 2-ethylhexanoate, methoxide, iodide, phenoxide, thiocyanate or ethyl acetoacetate to a solution of amoxycillin or an ethylamine salt thereof, said solution containing a pharmaceutically acceptable amide of the formula $RCONR_1R_2$, wherein R is a hydrogen atom or a methyl group, and $R_1$ and $R_2$ are each a hydrogen atom or a methyl or ethyl group.

2. A process as claimed in claim 1, wherein the salt is the diethylamine salt.

3. A process as claimed in claim 1, wherein the amide is dimethylformamide.

4. A process as claimed in claim 1, wherein the amide is dimethylacetamide.

5. A process as claimed in claim 1, wherein the source of alkali metal cations is sodium 2-ethylhexanoate or sodium methoxide.

* * * * *